United States Patent Office.

ELLIOT SAVAGE, OF WEST MERIDEN, ASSIGNOR TO HIMSELF AND JULIUS HOTCHKISS, OF MIDDLETOWN, CONNECTICUT.

Letters Patent No. 102,324, dated April 26, 1870.

IMPROVEMENT IN THE MANUFACTURE OF ALLOYS OF MANGANESE.

The Schedule referred to in these Letters Patent and making part of the same.

*To all whom it may concern:*

Be it known that I, ELLIOT SAVAGE, of West Meriden, in the county of New Haven and State of Connecticut, have invented a new and useful Improvement in the Production of Metallic Alloys of Manganese; and I do hereby declare that the following is a full, clear, and exact description of the same.

It is well known that manganese is with great difficulty reduced to a purely metallic state, owing chiefly to its great degree of chemical affinity for oxygen.

In the specification for Letters Patent of the United States granted me for "improvement in alloys of manganese," numbered 99,007, and dated January 18, 1870, and to which reference is herein made, I mention the use of cyanide of potassium as a reducing agent.

In the further development of the above-named invention, I have discovered that the cyanide of potassium performs two important offices: first, that of a reducing agent, and second, when used in sufficient quantity, that of a protection to the reduced manganese from the free oxygen of the furnace, because the potassium has a greater chemical affinity for oxygen than the metallic manganese, and by thus taking up or absorbing the free oxygen of the furnace, it enables the manganese to readily unite with the other metal or metals with which it is to be alloyed.

This effect is owing, in part, to the fusible nature of the cyanide of potassium, which causes it to be distributed throughout the crucibles or pots in which the reduction is made.

Other carbonaceous substances used for this purpose, by being placed in the pots or crucibles, do not sufficiently protect the manganese, because they cannot be perfectly distributed throughout the crucibles, so as to envelop or surround the small particles of manganese metal.

The crucibles or pots in which the manganese oxide is placed to be reduced, are found to be no adequate protection to the manganese from the action of the free oxygen of the furnace.

There is one objection to the use of the cyanide of potassium for the above purpose, and that is that it adds greatly to the cost of the manufacture of the manganese alloys. The improvement which is the subject of this invention obviates the necessity for its use, or at least for its use in any large quantity, by effecting a proper regulation of the supply of oxygen to the furnace to produce and maintain in that part thereof where the pots or crucibles are heated, a "reducing atmosphere," that is to say, an atmosphere in which there is no free oxygen, but, on the contrary, a great excess of ignited reducing gases, which surround and permeate the pots or crucibles, thus, in connection with the heat, performing the office of reduction, and also preventing the loss or waste of the manganese metal while it is uniting with the metal or metals with which it is to be alloyed, and thus greatly reducing the cost of the manufacture of said alloys.

To accomplish the above purpose, the fuel used is placed in a part of the furnace separated from the compartment in which the crucibles or pots are placed to be heated, and the gases generated by the fuel are mixed with such a quantity of air as to produce and maintain a great excess of ignited reducing gases in said heating-chamber during the process of reduction.

When the above-mentioned conditions of the heating-furnace are perfectly obtained, the mixing of other carbonaceous or reducing agents with the oxide of manganese in the pots or crucibles is not necessary, the metallic manganese being reduced when the fusion of the metal is accomplished, the excess of ignited reducing gases in the furnace permeating the crucibles or pots in which the oxide of manganese and the metal or metals with which it is to be alloyed are contained, and taking up and removing the oxygen as it is liberated from the oxide of manganese. This enables an alloy to be produced of manganese and copper without the addition of nickel, which greatly surpasses in quality the best "German" or "nickel silver."

The furnace for this purpose might be variously constructed, but that known as the "Siemen's" furnace is peculiarly suitable in its construction and operation, as in it the necessary conditions are fulfilled.

I will give, as an example of the alloys which may be produced by this process, an alloy composed of copper and manganese, intended as a substitute for "German" or nickel silver."

To produce thirty (30) pounds of this alloy, I take twenty-four (24) pounds of copper and eighteen (18) pounds of crushed or powdered peroxide of manganese, which I place together in a suitable crucible or pot, (one made principally of graphite I prefer,) upon the mouth of which I place a suitable cover, to prevent fine particles of the oxide of manganese from escaping during the process of reduction.

This pot or crucible, when so prepared, I place, by preference, in the heating-chamber of a "Siemen's" furnace, and subject it to a high degree of heat for two or three hours, or until the manganese metal is found to be reduced. The pot is then taken from the furnace, and the molten alloy poured into a suitable mold, or it may be allowed to cool in the pot or crucible. The resulting alloy of copper and manganese can then be remelted and cast in the usual manner, and can then be rolled or hammered into such shape as may be wished, the metal possessing a high degree of hardness, ductility, and malleability, and in color and luster closely resembling silver.

Alloys of copper and manganese may be produced in the same way with various proportions of copper and oxides of manganese, and other metals, as nickel or zinc, may be added, if desired.

What I claim as my invention, and desire to secure by Letters Patent, is—

The production of alloys of manganese and other metals, by subjecting such metals and the oxide of manganese together, to the action of heat, in an atmosphere of ignited reducing gases, substantially as herein described.

ELLIOT SAVAGE.

Witnesses:
JOHN D. ROSSET,
HENRY PALMER.